March 14, 1939.  R. E. SCHIEBER  2,150,343
SCREW DRIVING MEANS
Filed Oct. 9, 1936
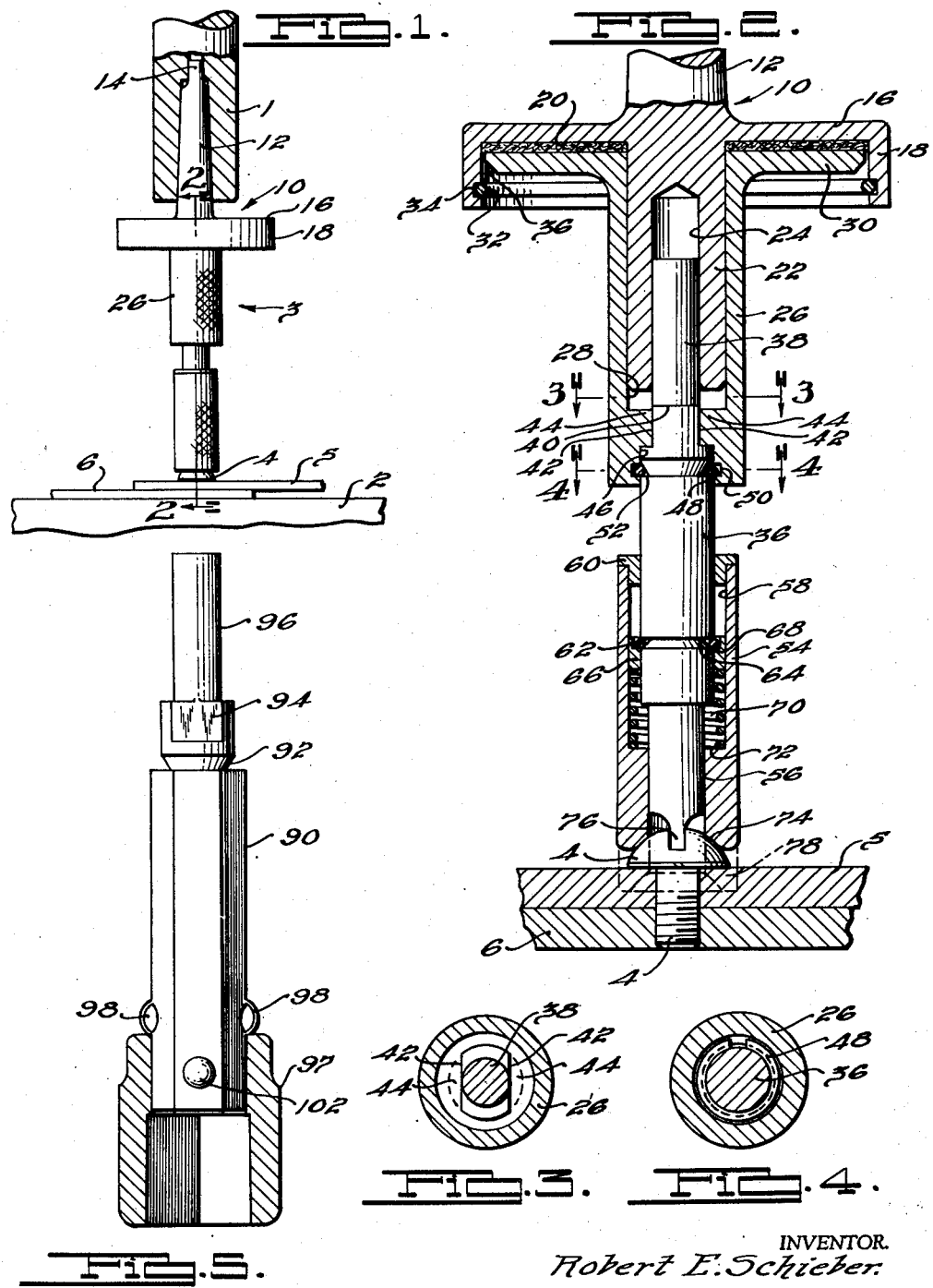
INVENTOR.
Robert E. Schieber
BY
Harness, Dickey, Pierce & Hann
ATTORNEYS.

Patented Mar. 14, 1939

2,150,343

UNITED STATES PATENT OFFICE 2,150,343

SCREW DRIVING MEANS

Robert E. Schieber, Detroit, Mich.

Application October 9, 1936, Serial No. 104,767

2 Claims. (Cl. 144—32)

The invention relates to an attachment for a conventional drill press adapted to be used for driving screws and the like.

It is the general object of the invention to provide an attachment for a conventional drill press of the type in which the drill spindle is moved axially by a manual lever, which attachment may be utilized for driving screws and is characterized by the fact that the twisting force exerted by the screw driving element is limited in accordance with the axial pressure exerted by the drill spindle in order that the maximum twisting force may be readily controlled by the operator.

A further object of the invention is to provide an attachment of the type mentioned wherein the screw driving element is driven through a friction clutch which is permitted to slip when the screw is driven home with the desired degree of tightness.

A further object of the invention is to provide an improved attachment of the type described wherein relatively few simple parts are required, which parts are releasably held in assembled position by a resilient retaining device in order that the attachment may be readily disassembled for repair, replacement, or inspection.

Another object of the invention is to provide a device of the character described embodying an improved means for guiding the screw driving element with respect to the screw head to prevent the screw driven element from slipping out of engagement with the head and marring the work or interrupting the driving operation.

Other objects and advantages of the invention will become apparent from the following specification, the accompanying drawing and appended claims.

In the drawing, wherein like numerals are applied to like parts in the several views:

Figure 1 is a fragmentary illustration of a drill press showing the drill spindle, the supporting table and the attachment constituting the invention applied thereto;

Fig. 2 is an enlarged axial section of the attachment shown in Fig. 1;

Fig. 3 is a transverse section taken on the line 3—3 of Fig. 2;

Fig. 4 is a transverse section taken on the line 4—4 of Fig 2; and

Fig. 5 shows a modified form of a screw driven head adapted for use on hexagonal headed screws.

Referring to Fig. 1, there is shown the lower end of a drill spindle 1 of a conventional drill press, having a work supporting bed 2. The details of the drill press are not shown inasmuch as they are conventional, but preferably the press is of the type having a hand operated lever for feeding the drill spindle axially towards the work. As shown in Fig. 1, the screw driving attachment 3 constituting the present invention is attached to the drill spindle and is adapted to drive a screw into a pair of members 5 and 6 which it is desired to secure together.

The screw driving attachment comprises a driven element 10 having a tapered shank 12, preferably of the conventional Morse taper, in order that it may be inserted into the usual opening in the lower end of the drill spindle 1. The extremity of the tapered portion 12 of the driven element is flattened at 14 and extends into a suitable cooperating slot in the drill spindle in order to provide a driving connection. At the lower end of the tapered portion 12 the driven element is provided with a radially extending flange 16 adapted to constitute one of a pair of cooperating friction clutch elements; and the periphery of the radial flange 16 is provided with an axially directed flange 18 adapted to house the clutch assembly. If desired, a suitable clutch facing material 20 may be secured in any desired manner to the under face of the flange 16 within the confines of the flange 18. Any desired material may be used for the facing 20, but ordinary graphite gasket material has been found satisfactory.

Below the flange 16, the driven element is provided with a downwardly extending cylindrical extension 22 having an axial bore 24 for a purpose to be described hereinafter.

A coupling member 26 having an axially extending bore 28 is journaled on the lower extension 22 of the driven element; and the member is provided with a radially extending flange 30 adapted to frictionally engage the clutch facing material 20 to provide a friction drive between the driven element and the coupling member. The driven element and coupling member are releasably held against axial displacement by means of a split spring retaining ring 32 seated within a groove 34 on the inner face of flange 18. This spring prevents accidental withdrawal of the coupling member from the driven element but may be readily removed when it is desired to disassemble these members.

A screw driving element 36 provided with a reduced shank portion 38 is inserted into a suitable opening in coupling member 26 until the reduced shank 38 is journaled within the bore 24 of extension 22 of the driven element. The screw driving element below the shank portion 38 is enlarged in diameter as at 40, and the upper extremity of this portion of enlarged diameter is provided with oppositely disposed flats 42, as best shown in Figs. 2 and 3. These flats are adapted to fit cooperating inward projections 44 on the walls of the coupling member 26 in order that the coupling member may drive the screw driving element. The coupling member 26 is provided below the projections 44 with a counterbore 46 adapted to receive the enlarged cylindrical portion of the screw driving element; and a retaining spring 48 positioned within cooperating grooves 50 and 52 in the coupling member and screw driving element respectively operates to releasably retain the screw driving element in assembled relation with respect to the coupling member. Retaining spring 48 is split and the upper side wall of groove 52 is conical in form in order that the spring may be cammed outwardly into groove 50 when the screw driving element is withdrawn from the coupling member.

Means are provided for guiding the screw driving element into engagement with the head of the screw and for holding it in driving relation with respect thereto during the screw driving operation. This means comprises a cylindrical guide member 54, having a bore 56 adapted to receive the lower end of the screw driving element, and an enlarged counterbore 58 in its upper end. The open end of the counterbore 58 is closed by means of a cap member 60 which is press fitted into the open upper end of the cylindrical guide member 54 and is provided with an opening adapted to slidably receive the main body of the screw driving element. A split spring retaining ring 62 is carried by the screw driving element within a suitable groove 64, the lower side wall of which is conical in form in order that the spring 62 may be cammed outwardly when it engages the underside of cap 60 to permit the complete withdrawal of the screw driving element from guide member 54. This spring element, however, normally retains the guide member on the screw driving element and prevents accidental displacement thereof.

Journaled on the screw driving element within the counterbore 58 and below groove 64 is a ring 66 provided with an internal shoulder 68 adapted to engage the spring ring 62; and a coil spring 70 surrounding the screw driving element within the counterbore 58 and bears against the ring 66 and the shoulder 72 at the lower end of the counterbore 58, thus normally urging the guide member 54 downwardly with respect to the screw driving element.

While, as shown in Fig. 2, the lower extremity of the screw driving element is of reduced diameter to fit the bore 56, it will be understood that the diameter of this portion of the screw driving element and bore 56 may be selected as desired in accordance with the size of the screw which is being driven. It is contemplated that with the attachment a plurality of screw driving elements and associate guiding members will be provided, each assembly of screw driving element and guiding member being designed to fit a screw of a different size. It will be apparent, therefore, that each of the assemblies will be identical to each other except with respect to the diameter of the bore 56 in the guiding member 54 and the diameter of the lower end of the screw driving element which fits bore 56, these two dimensions being varied in the several units in accordance with the size of the screw to be driven.

It is apparent from the above that when the screw driven element is not in engagement with the head of a screw the guiding member 54 occupies the position indicated in dotted lines at 78 in Fig. 2, being urged into that position by means of the spring 70. Accordingly, as the attachment is advanced towards the head of the screw desired to be driven, the guiding member 54 will project in advance of the screw driving element and will engage the head of the screw prior to the engagement by the screw driving element proper. The lower end of the guiding member 54 is provided with a conical surface 74 adapted to engage the screw head and center the same with respect to the screw driving element. Following engagement of the screw by member 54 the attachment is further advanced towards the head of the screw until the lower end of the screw driving element, which is flattened at 76 in the usual manner, enters the slot provided in the head of the screw. In addition to the above described function, guiding element 54 operates to retain the screw driving element in operative engagement with the head of the screw during driving thereof and thereby prevents injury to the member 5 or interruption of the screw driving operation.

It will be observed that the twisting force exerted is transmitted entirely through the frictional engagement between clutch elements 16 and 30, and that, therefore, the twisting force is directly proportional to the axial pressure exerted upon the screw head. Since this axial pressure is under the control of the operator through the conventional axial feed handle for the drill spindle, the operator may readily control the amount of twisting force and limit such force to that required. When the screw is driven home the frictional surfaces 16 and 30 will simply slide relative to each other without any increase in force exerted upon the head of the screw.

In Fig. 5 is shown a screw driving element adapted for use in connection with screws having square or hexagonal heads in which no slots are provided. This screw driving element is provided with a shank 96 similar to shank 38 of the element shown in Fig. 2, and is also provided with flats 94 and groove 92 similar to flats 42 and groove 52 in the form shown in Fig. 2, this structure being identical to that in the previously described modification in order that this device may be used in connection with the driving element and coupling member assembly previously described. The remainder of the element, however, is different in that it comprises a simple hexagonal shank 90 upon which is carried a conventional socket wrench 97. Preferably the socket 97 is removable from the shank 90 in order that various sizes of sockets may be utilized. Accordingly, the shank 90 is provided with peened out projections 98 adapted to limit movement of the socket 97 onto the shank, and a conventional spring pressed ball 102 is utilized for frictionally holding the socket against accidental displacement. It will be observed in this form that since socket member 97 encloses the screw there is no necessity of providing a guiding member as in the structure previously described. In other respects operation of this form of the invention is similar to that described in connection with that described in Fig. 2.

It will be observed that in accordance with the present invention that there is provided an exceedingly simple and inexpensive attachment for a drill press which will adapt it for driving screws, and which attachment may be readily disassembled for repair, replacement or inspection.

While only two forms of the invention have been disclosed, it is apparent that others are available within the spirit of the invention and within the scope of the appended claims.

What is claimed is:

1. An attachment for a drill press having a spindle comprising a driving element adapted to be operatively connected to and rotated by said spindle, said driving element having an outwardly extending flange and an axially directed cylindrical guiding portion, a driven element journaled on said guiding portion and having an outwardly extending flange adapted to make a frictional connection with the outwardly extending flange on the driving element, cooperating means on said outwardly extending flanges for limiting the axial separation thereof, said driven element having an opening for the reception of the shank of a twisting tool to be driven thereby, and said axially directed cylindrical guiding portion of the driving element having an axially directed bore in alignment with said opening in the driven element whereby the shank of said twisting tool will extend into and be guided by said bore.

2. An attachment for a drill press having a spindle comprising a driving element adapted to be operatively connected to and rotated by said spindle, said driving element having a radially extending flange provided with a cylindrical axially directed marginal flange, a driven element rotatably carried by said driving element and having a radially extending flange adapted to make a frictional connection with the radially extending flange on the driving element, an internal groove in said axially directed marginal flange, a removable resilient snap ring seated in said groove and adapted to engage the radially extending flange on the driven element to prevent axial separation of said elements, and means on said driven element for receiving a twisting tool.

ROBERT E. SCHIEBER.